(No Model.)
E. THOMSON.
ROTARY TRANSFORMER.
No. 563,895. Patented July 14, 1896.
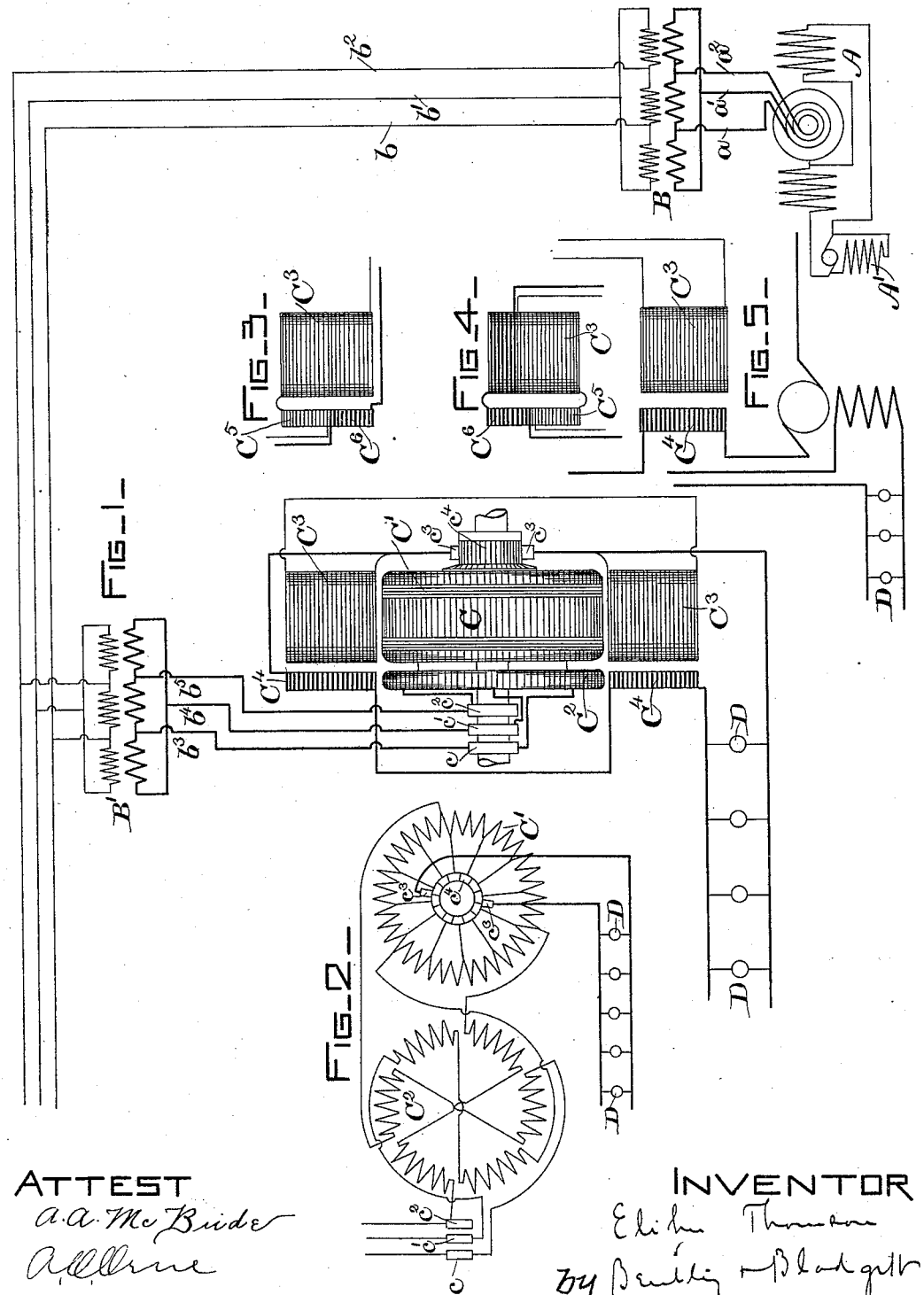
ATTEST
A. A. McBride
A. L. Dunn
INVENTOR
Elihu Thomson
by Bentley & Blodgett
Attys.

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

ROTARY TRANSFORMER.

SPECIFICATION forming part of Letters Patent No. 563,895, dated July 14, 1896.

Application filed December 21, 1893. Serial No. 494,293. (No model.)

*To all whom it may concern:*

Be it known that I, ELIHU THOMSON, a citizen of the United States, residing at Swampscott, county of Essex, and State of Massachusetts, have invented certain new and useful Improvements in Dynamo-Electric Machines, of which the following is a specification.

My present invention relates to dynamo-electric machines, its object being to provide a simple means for compounding an electric machine, which on one side takes, for example, polyphase currents and gives out on the other side, through a commutator, continuous currents; in other words, a motor-generator which is driven by polyphase alternating currents and delivers continuous currents equivalent thereto for continuous-current work. The function of the machine might be reversed in that it can take in by its commutator continuous currents and deliver polyphase currents, such as three-phase currents.

The particular object of my invention is to make such a machine capable of self-regulation equivalent to a compounding action, whereby when the load on the machine is great, as is the case when the current taken to the work-circuit is increased by the addition of more translating devices, there shall be an automatic increase in the potential of the current, so as to maintain a constant efficiency or to increase the potential by a certain percentage, whereby all or the greater part of the fall or drop in potential may be taken care of by the machine itself, and even the drop on the lines which feed the apparatus from a distant point may be compensated for.

My invention is applicable for use in such systems as those in which a main generator furnishes either directly or by transformation upward fairly-high-potential currents of polyphase character, as, for example, in a three-phase system, and delivers such currents to lines which pass through long distances, and, at points where it is desirable to utilize the electric energy, feeds the current either directly or through step-down transformers to a motor-generator receiving the high-potential polyphase currents and giving out continuous currents, the continuous currents being used on the local circuits to do work. Nothing in my invention would prevent the application of the same principles to single-phase alternating currents when such currents are used to drive a similar apparatus, as they could be treated in the same way. It is preferable, however, that polyphase currents, meaning thereby currents of any desired number of phases, such as three-phase currents, be employed, as the system then becomes more manageable and efficient.

In the accompanying drawings, Figure 1 is a diagram of my motor-generator and circuits. Fig. 2 is a diagram showing the winding of the armature thereof. Figs. 3 and 4 are details showing modifications in the method of winding the field-magnets, and Fig. 5 is a diagram showing further modification.

Referring to Fig. 1, A is a generator at a generating-station, the field-magnets of which are excited by the machine A'. This generator is adapted to deliver three-phase currents to a low-potential local winding through the wires $a\ a'\ a^2$, thereby feeding the primaries of a set of transformers B, the secondaries of which are connected to the mains $b\ b'\ b^2$, leading off to step-down transformers B', which deliver currents from their secondaries through the wires $b^3\ b^4\ b^5$ to three rings $c\ c'\ c^2$ on the shaft of a motor-generator C. These currents traverse the armature C' of the motor-generator, and by the same or a separate winding continuous currents are delivered from the commutator $c^4$ to the brushes $c^5$, the continuous currents feeding the translating devices D. Excitation of the field of the motor-generator is effected by the shunt-coils $C^3$, connected across the continuous-current circuit.

The particular feature of my present invention consists in so dividing the field and the armature of the motor-generator that while the field excited by the coils $C^3$ remains constant, due to constant or nearly constant potential being preserved between the brushes $c^3\ c^3$, the coils of an accessory regulating-field $C^4$, placed adjacent to the larger field, may be traversed by the load-current, or current from the brushes $c^3$ to the translating devices D, its winding being in series with one of the main leads, whereby, as the load changes, the effect of the field-coils $C^4$ on the accessory-field cores which they surround may gradually change. The armature of the machine is in like manner provided with a main portion $C'$ and an accessory portion $C^2$, the main portion $C'$ being affected by the main field due to coils $C^3$, and the accessory portion $C^2$ being affected by the accessory field due to coils $C^4$. The armature for a bipolar machine, which construction is shown for the sake of simplicity, is more clearly indicated in Fig. 2, where the rings $c\ c'\ c^2$ are shown as connected to the winding on the accessory-armature $C^2$, as a three-phase winding, through six coils on the said accessory armature, the connections with the rings being at points one hundred and twenty degrees angularly apart and the diametrically opposite coils being coupled together, forming three pairs. From these coils on the accessory armature the connections are carried on to three points on a closed-circuit winding on the main armature $C'$, which points are also one hundred and twenty degrees apart and at such positions that the relation of the field-poles and three-phase connection is symmetric in the two armatures $C'$ and $C^2$. The brushes on the commutator $c^4$ are placed at their proper position for commutation or at the diameter of commutation. The turns of wire on the accessory armature $C^2$ would be shorter than those on $C'$, as the function of the accessory armature $C^2$ is merely to take care of a part only of the work.

The action of the device is as follows: When there is a light load on the work-circuit which contains the translating devices D, or a small demand for current on said circuit, there is a correspondingly small current passing in at the rings $c\ c'\ c^2$ through the accessory armature $C^2$ and in the coils of the main armature $C'$. Because the accessory field is in circuit with the lamps or other translating devices D, which are taking but little current, there is little or no action due to this field, and an electromotive force is maintained between the lines feeding the lamps corresponding to that which is impressed at the rings, or equivalent to such impressed electromotive force when translated into continuous current by the commutator $c^4$. Now, if the load should be increased by introducing additional translating devices to a considerable amount, this correspondence of potential would be no longer preserved, but there would be a drop of potential in the main armature $C'$ and also in the accessory armature $C^2$, the lines $b^3\ b^4\ b^5$ feeding the rings, the transformation, and in fact in all parts of the system. This drop of potential could in a measure be taken care of by compounding the generator A, or increasing its potential under load, and this would be the proper procedure where there is only one motor-generator fed by the mains $b\ b'\ b^2$; but in cases where such lines feed a number of loads of different kinds, or a number of motor-generators working practically independently of one another, the drop of potential in each motor-generator and the lines connecting it to the mains and in the transformers which may be inserted in such lines should be taken care of by the individual motor-generators themselves; and this result my present invention attains, for as the number of transmitting devices is increased the accessory field $C^4$, Fig. 1, from being inactive under no load becomes active and in turn reacts upon the revolving armature $C^2$ to produce in said armature, the connections being suitably made, an electromotive force which assists the impressed electromotive force applied at the rings $c\ c'\ c^2$ through the circuit of the armature $C'$, and thereby prevents the drop of potential, or even increases the potential in the local circuit feeding the translating devices D D. In other words, an effect corresponding to an increase in length of the armature-winding as a whole is obtained through the action of the accessory armature $C^2$, which then becomes, as it were, a separate three-phase generating-machine assisting the main pulses of current in direct proportion to the current demanded, which is commuted at $c^4$ and utilized on the working circuit. The accessory-field coils $C^4$ are wound in a direction altogether dependent on the direction of the winding on the armature $C^2$, and a number of arrangements might be employed to effect the desired result.

It is not the intention to limit the invention to having the accessory field comprising the coils $C^4$ excited directly by the armature-currents taken from the commutator, as it is well known that such currents might be made to pass through the field-coils of an exciter-machine so as to furnish a gradually-increased excitation by said machine when driven at a definite speed as the load comes on, the field of said machine thereby being excited by the current led to the translating devices D D, while its armature-current is fed into the coils $C^4$. Such a modification is shown in Fig. 5. Nor is it intended to limit the invention to having the coils of the accessory armature $C^2$ working always to assist the impressed electromotive force at the rings $c\ c'\ c^2$, as it is manifestly capable of working in just the opposite way, that is, of becoming a source of counter electromotive force, beating back the main impulses under no load, which counter electromotive force is entirely removed under full load, or in some cases not only removed but replaced by an electromotive force assisting the main impulses. This latter arrangement would give the widest possible range of regulation with a given size of accessory armature. In such cases, however, it is necessary to excite the accessory-field cores initially along with the main field and by a similar current, as indicated in Fig. 3, where a coil $C^5$ on the accessory field is in circuit with the main-field coil $C^3$ and receives current at the same time. This excitation will, by the direction of the windings, be made such as to produce an opposing or triphase counter electromotive force in the windings of the accessory field, which will at no load beat back the impulses or reduce their force, as stated above. In conjunction with this initial excitation due to coil $C^5$ for opposing the effect of the accessory field there is another coil $C^6$, differentially wound, traversed by the local current feeding the translating devices D D, and indicated in Fig. 3 by the heavy lines. An increased load gradually increases the effect of this differential winding, which may be so proportioned as to entirely annul the initial excitation of the accessory field at full load. The differential action of the load-coil $C^6$ may be so proportioned that under full load it not only overcomes the initial excitation of coil $C^5$, but replaces it by an excitation of opposite character. Thus instead of the action of the armature $C^2$ being an opposing or counter-electromotive force it becomes an added electromotive force, which helps the pulses under full load to reach the main armature $C'$, where the transformation into continuous current takes place. By properly proportioning the effect of the turns a proper variation in the effect of the armature-winding may be attained, and with it the desired compensation for fall of potential in the system.

Fig. 4 shows a further modification, in which the above-described variation is extended so as to include the main as well as the accessory field by placing a portion of the local or load circuit thereon. In this case the function of the auxiliary field is simply extended to the main field by winding series coils on said main-field core adapted to act either accumulatively or differentially with the main shunt-coils, the latter giving rise to constant excitation, while the former produces variable excitation, according to the load on the work-circuit.

What I claim as new, and desire to secure by Letters Patent, is—

1. A rotary transformer having a main armature connected upon one side to the commutator, and receiving or delivering upon the other side polyphase alternating currents, a field-magnet coöperating therewith, having a coil the effect of which is substantially constant, a second or accessory armature connected in series with the main armature upon the alternating-current side, and an independent field-magnet coöperating with the accessory armature and deriving an excitation from the main continuous-current circuit varying in effect according to the current therein.

2. A rotary transformer comprising a main armature having a single winding connected upon one side to a commutator and receiving or delivering upon the other side alternating currents, a field-magnet for the main armature, an accessory armature connected in series upon the alternating side to the main armature, and a field-magnet in series in the continuous-current circuit coöperating with the accessory armature and furnishing a compounding or regulating effect for the machine proportioned to the current in the circuit.

3. A rotary transformer comprising a main armature receiving upon one side polyphase alternating currents and delivering upon the other side continuous current to the working circuit, an accessory armature connected in series with the main armature upon its alternating-current side, a series winding in the continuous-current circuit influencing a field-magnet for the accessory armature, and another field-magnet for the main armature.

Signed at Lynn, Massachusetts, December 16, 1893.

ELIHU THOMSON.

Witnesses:
JOHN W. GIBBONEY,
BENJAMIN B. HULL.